United States Patent [19]
Larson et al.

[11] Patent Number: 5,474,028
[45] Date of Patent: Dec. 12, 1995

[54] ANIMAL FEEDING NIPPLE

[75] Inventors: Leigh R. Larson, Johnson Creek; Reed A. Larson, Watertown; Alan Novy, Oregon, all of Wis.

[73] Assignees: Merrick's, Inc., Middleton; Hi-Life Rubber Inc., Johnson Creek, both of Wis.

[21] Appl. No.: 187,445

[22] Filed: Jan. 25, 1994

[51] Int. Cl.⁶ .................................................. A01K 9/00
[52] U.S. Cl. ............................................ 119/71; 215/11.5
[58] Field of Search .............................. 119/71; 215/11.4, 215/11.5

[56] References Cited

U.S. PATENT DOCUMENTS

| | | |
|---|---|---|
| Re. 11,086 | 6/1890 | Eggers ........................................ 215/11.5 |
| 805,641 | 11/1905 | Gallagher . |
| 1,146,639 | 7/1915 | Miller . |
| 1,510,571 | 10/1924 | Ware . |
| 2,616,581 | 11/1952 | Madsen et al. . |
| 2,699,778 | 1/1955 | Ezell ........................................ 119/71 X |
| 3,042,002 | 7/1962 | Liell ............................................ 119/71 |
| 3,593,870 | 7/1971 | Anderson ................................ 215/11.5 |
| 4,993,568 | 2/1991 | Morifuji et al. .................... 215/11.5 X |
| 5,101,991 | 4/1992 | Morifuji et al. ........................ 215/11.1 |

FOREIGN PATENT DOCUMENTS 2250017  5/1992  United Kingdom ................... 215/11.5

Primary Examiner—Robert P. Swiatek
Attorney, Agent, or Firm—Reinhart, Boerner, Van Deuren, Norris & Rieselbach

[57] ABSTRACT

A nipple for feeding liquids to domesticated mammals.

9 Claims, 2 Drawing Sheets 5,474,028

ANIMAL FEEDING NIPPLE

TECHNICAL FIELD

This invention relates to a nipple for feeding liquids, such as milk or milk replacer, to domesticated mammals, particularly young mammals such as calves, piglets, lambs, foals, puppies, kittens, or the like.

BACKGROUND OF THE INVENTION

A conventional animal feeding nipple for feeding liquids, such as milk or milk replacer, to domesticated mammals is formed out of a flexible, elastomeric or resilient material, such as natural or synthetic rubber or flexible plastic. The conventional nipple will comprise a nipple tube, on which the mammal will suckle to withdraw liquid, connected to a means for attaching the nipple tube to a liquid-feed receptacle or container. See, for example, U.S. Pat. Nos. 2,628,591, 2,699,778 and 3,042,002.

The conventional nipple may be attached, via the attachment means, to a liquid-feed receptacle or container, such as a closed plastic or glass bottle, carboy, barrel, pail, or the like, in which the liquid feed is sealed from atmospheric pressure and from which the liquid feed can flow into the inside of the nipple tube. Typically the nipple will be attached to the closed liquid-feed receptacle or container at a position such that the liquid feed will flow under the influence of gravity into the inside of the nipple tube.

The conventional nipple comprises proximate the distal end (i.e., the end furthest from the receptacle) of the nipple tube a self-sealing orifice or aperture. In response to sucking by a mammal on the nipple tube during suckling, this aperture opens and allows liquid to flow into the mammal's mouth. Then, when the mammal, during the suckling cycle, discontinues sucking on the nipple tube, the aperture spontaneously seals and stops the flow of liquid.

Conventionally, before a mammal begins to remove liquid feed from a closed receptacle (e.g., a plastic bottle) through a nipple, where the inside of the receptacle and nipple is substantially sealed from atmospheric pressure, the liquid inside the receptacle and nipple will be at or close to atmospheric pressure. When liquid is removed from the closed receptacle through the nipple, by sucking by the mammal on the nipple tube, the pressure inside the nipple and the receptacle is reduced and, consequently, a pressure differential is created between the inside and outside of the receptacle and nipple. The pressure outside will typically be the local atmospheric pressure.

This pressure differential is a problem that impairs the efficiency of feeding liquids to domesticated mammals, especially milk or milk replacers to young mammals. The pressure differential causes low flow of liquid feed to the animal and may cause collapse or breakage of the liquid-feed receptacle.

Prior art nipples have a vent through the wall of the nipple, at a position which is not blocked from exposure to the atmosphere when the mammal is suckling on the nipple tube. The vent is present to overcome the problem of the pressure differential that is created during sucking of liquid out of the receptacle through the nipple. This vent may be located for example on a transverse portion of the nipple that joins the proximal end of the nipple tube (the end closest to the receptacle when the nipple is attached to a liquid-feed receptacle) to the means for attaching the nipple to the liquid-feed receptacle. During and after suckling, air is drawn into the nipple and feed receptacle through this vent to reduce and eventually eliminate this pressure differential. The vent in prior art nipples is simply a hole that traverses the wall of the nipple from the outside (the side exposed to the atmosphere) to the inside. The hole has the shape of a cylinder or a truncated cone, with the narrower cross-section of the cone at the inside surface of the nipple.

The vents in prior art nipples do not restrict flow of air or liquid to one direction, i.e., from outside to inside the nipple. A prior art vent with a cross-sectional area at the inside wall of the nipple that is large enough to be useful in relieving the pressure differential developed during suckling invariably allows leakage of liquid feed. Consequently, animal feeding nipples of the prior art that are effective in solving the problem of the pressure differential, discussed above, disadvantageously allow leakage of liquid feed out from the nipple-receptacle combination.

The present invention is directed to avoiding this problem of liquid feed leakage from vents present in prior art animal feeding nipples to relieve pressure differentials between the inside and outside of the nipples caused by suckling.

SUMMARY OF THE INVENTION

The present invention provides an improved nipple for feeding a liquid to a domesticated mammal from a receptacle in which (together with the attached nipple) the liquid is sealed from atmospheric pressure unless the mammal is sucking on the nipple tube. The nipple of the invention comprises a check valve which opens unidirectionally to allow air to flow from outside to inside the nipple to substantially eliminate pressure differentials across the nipple wall due to sucking by the mammal of liquid from the nipple. Because the check valve opens unidirectionally, liquid does not leak out of the nipple when the valve is open to allow pressure equalization.

DETAILED DESCRIPTION OF THE INVENTION

Figure 1:
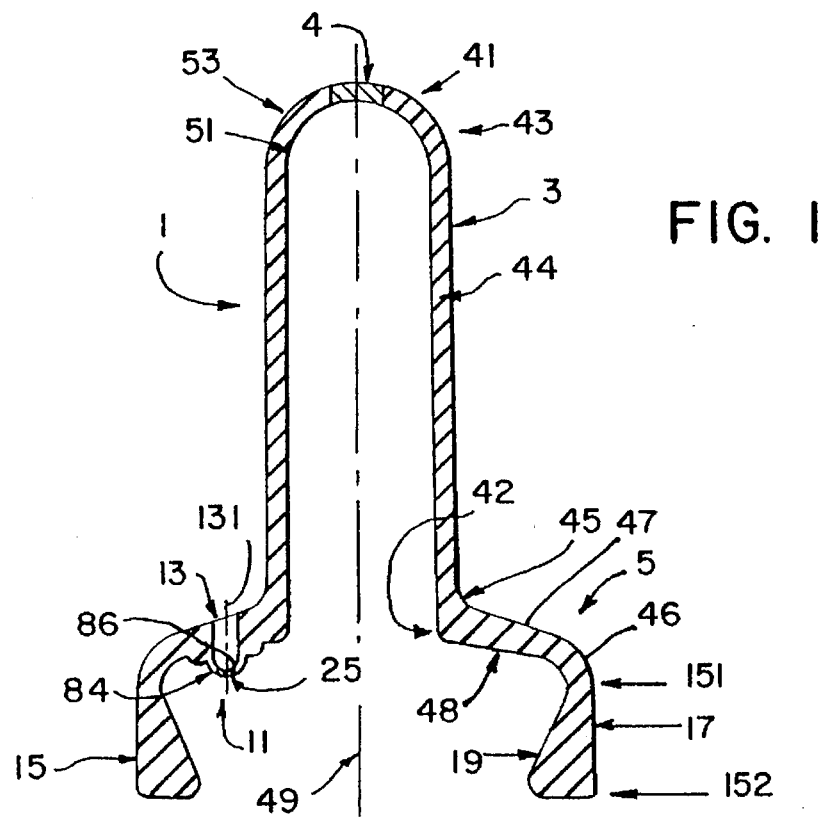
FIG. 1 is a side view, in a longitudinal section, of an animal nipple for feeding animals, showing an embodiment of the invention.

The invention entails an improved nipple for feeding liquids to domesticated mammals. The improvement of the invention is especially useful when the liquid needs to be drawn by suckling by the mammal from a receptacle, such as a bottle, the inside of which, together with the inside of the attached nipple, is not in communication with the atmosphere such that the pressure inside the receptacle (with attached nipple) drops as the mammal suckles liquid out.

More particularly, the invention entails, in a nipple for feeding liquids to a domesticated mammal, said nipple comprising an elastic molded body comprising:

(A) a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, (B) a traverse wall having an inner perimeter and an outer perimeter, said inner perimeter being joined contiguously over its entire length to the proximate end of the nipple tube and said outer perimeter being separated from said inner perimeter and more distant from the proximate end of the nipple tube than said inner perimeter, and having an external face and an internal face, said external face being on the side of the nipple not exposed to liquid feed and said internal face being on the side of the nipple exposed to liquid feed when the nipple is used, (C) a vent located between the inner perimeter and the outer perimeter of the traverse wall and extending from the external face to the internal face of the traverse wall, and (D) a means for attaching said nipple to a receptacle which contains liquid feed for the mammal, the improvement which comprises a check valve at the end of the vent at the internal face of the traverse wall, said check valve comprising a means for equalizing pressure inside and outside of the nipple during withdrawal of liquid from the nipple by suckling of the mammal while preventing leakage of liquid out of the nipple.

The improved nipple of the invention is made of any flexible or resilient material, such as natural or synthetic rubber or various flexible plastics or other polymeric materials, which are not harmful for domesticated mammals to suckle. Natural rubber is preferred. The process of making the improved nipple is by conventional injection or transfer molding. It is preferred that the nipples of the invention be molded as a single piece. Slits where called for may also be cut or stamped into the nipple by conventional processes.

With reference to the drawings, the animal nipple 1 has a nipple tube 3 which has a length and wall thickness that is suitable for the mammal which is intended to use the nipple. The preferred nipple illustrated in FIG. 1 has dimensions suitable for a bovine calf. Those of skill will readily understand how to adjust dimensions from those indicated in FIG. 1 to make a nipple suitable for other domesticated mammals.

Figure 1A:
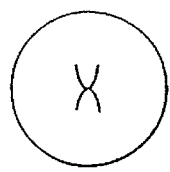
FIGS. 1A, 1B, 1C and 1D show a top view illustrating alternative variants for the check valve slit 12 as shown in FIG. 2.
Figure 1B:
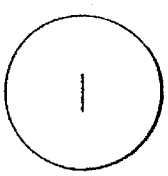
Figure 1C:
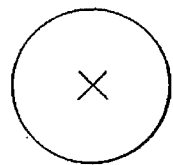
Figure 1D:
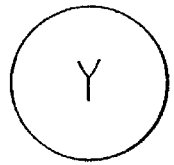

In the nipple 1, the nipple tube 3 has a distal end 41 and a proximate end 42, a wall 44, a self-sealing aperture 4, which may be a slit cut through the wall and having a shapes like those illustrated in FIGS. 1A–1D. A slit in the shape of a "stylized X" is illustrated in FIG. 1A. In a preferred embodiment, the nipple tube 3 will be substantially cylindrical about an axis 49 (i.e., as nearly as possible cylindrical given tolerances of molds and materials used in construction of the nipple) and will have a cap 43 at the distal end, which cap will include the self-sealing aperture 4. The liquid leaves the nipple and enters the mammal through the self-sealing aperture 4 as the mammal suckles the nipple tube. The nipple 1 also includes a traverse wall 5, which has an inner perimeter 45 and an outer perimeter 46 and an outer face 47 and an inner face 48. The nipple has a vent 13, which is preferably an opening which is substantially cylindrical about an axis 131. In the nipple, there is also a means for attaching the nipple to a receptacle, such as a plastic bottle, holding the liquid to be fed to the mammal. This means is preferably a side wall 15, which has a top 151, a bottom 152, an outer face 17 and an inner face 19. The side wall inner face 19 has appropriate means for holding the animal nipple 1 to the feed receptacle. Thus, the inner face may have a pitch, as illustrated in FIG. 1, or threads to twist on to a bottle. Alternatively, the means of attachment of the nipple to the receptacle may be by a clamp.

Figure 3:
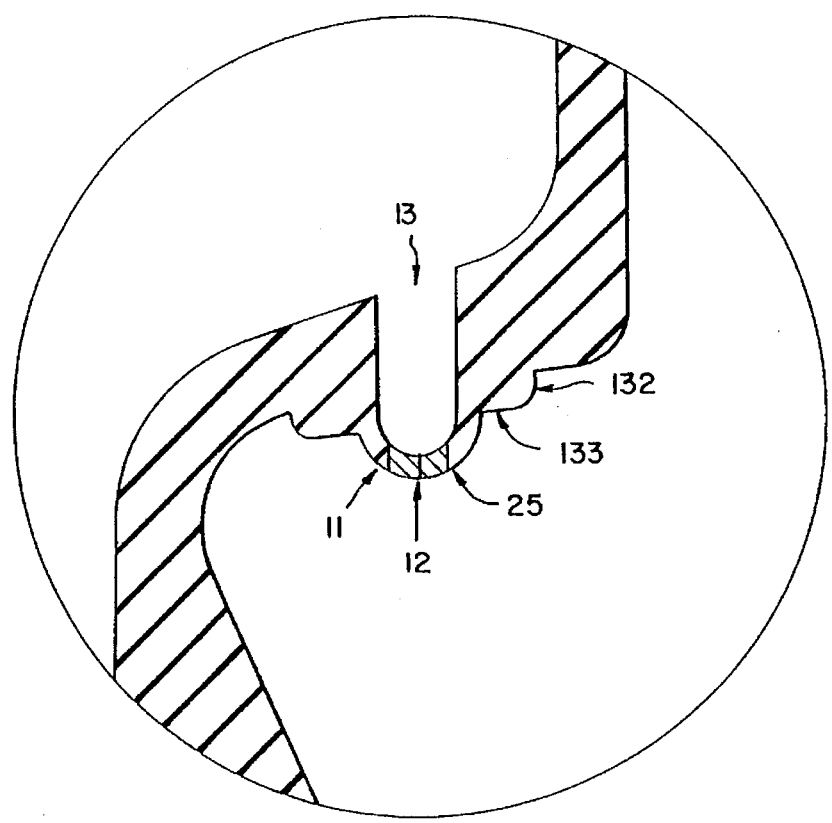
FIG. 3 is an enlarged detail portion of the animal nipple illustrated in FIG. 1 showing the check valve.

The improvement in the nipple of the invention resides in the check valve 11 at the inner end of the vent 13. The check valve comprises a means for equalizing pressure inside and outside of the nipple during withdrawal of liquid from the nipple by suckling of the mammal while preventing leakage of liquid out of the nipple. A preferred means to accomplish this is illustrated in FIG. 3. This preferred means entails an annulus 132 which surrounds the vent hole and a top face 133 positioned inwardly from the inner face of the traverse wall and capped by a second cap 25 which projects inwardly and blocks the vent and has a small slit 12 which is cut through the cap. The slit may have shapes such as those illustrated in FIGS. 1A–1D, including possibly a stylized X shape. The slit opens in order to allow air to flow unidirectionally through the check valve 11 into the feeder receptacle to equalize a pressure differential which is created by the animal withdrawing feed from the receptacle through the nipple tube 3. The check valve slit 12 remains closed when no pressure differential exists, or when pressure inside is higher than pressure outside the nipple, in order to prevent liquid from leaking out of the nipple. A plurality of such check valves 11 may be provided.

Figure 2:
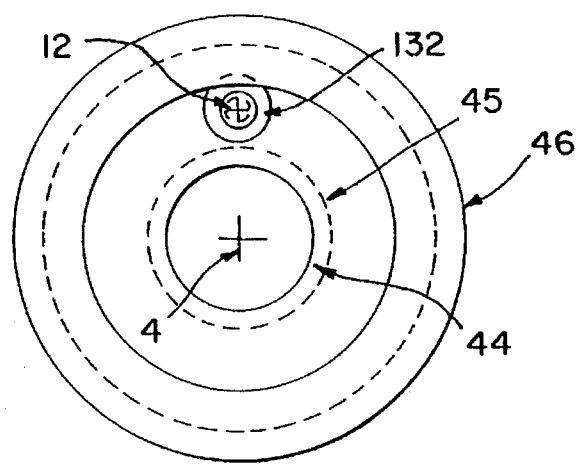
FIG. 2 is a top view, in an horizontal section, of an animal nipple for feeding animals in accordance with the invention.

As shown in FIG. 2, the check valve slit 12 in the illustrating example is in the shape of a stylized letter X, but said slit 12 may be otherwise shaped in other manners which include, but are not limited to, an I-shaped slit, a Y-shaped slit or an X-shaped slit.

The check valve 11 may utilize other means for regulating the unidirectional flow of air into the feed receptacle and preventing feed from leaking out. Such means include, by way of illustration only, the use of a flapper valve or a duck-bill valve in place of the annulus 132, cap 25 and slit 12.

Although the present illustration presents the outer surface of the animal nipple 1 to be smooth, the traverse wall 5, the side wall 15, or both, may optionally be formed in such a manner so as to contain a roughening means for ease in handling. Such means would be integrally molded into the traverse wall external face, and/or the outer face of the side wall 17 in the usual way. These means may include patterns or ridges cast into either face, or may be formed of accurately arranged groups of letters and/or words that are raised above the appropriate face of either wall. These groups of letters and or words may comprise indicia relating to the name of the manufacturer, his location or a trademark. Thus the means comprises a multiplicity of sharply defined projections that constitute roughening that facilitates the fastening and removal of the animal nipple to the food receptacle.

With reference to FIG. 1, illustrative dimensions for a preferred nipple, made of natural rubber and suitable for a bovine calf, are as follows. All dimensions stated here are approximate. All radii of curvature (hereinafter "RC"), as well as thicknesses and lengths, are in centimeters. The cap 43 of nipple 1 has both an inner surface 51 and an outer surface 53. The inner surface 51 of the cap 43 has a RC of 0.980, and the outer surface 53 of the cap 43 has a RC of 1.240. The second cap 25 has an inner surface 84 with an RC of 0.318 and an outer surface 86 with an RC of 0.198. The overall length of nipple 1 from the bottom 152 to the apex of the cap 43 (where the axis 49 intersects outer surface 53) is 10.236. The outer radius of the nipple tube 3 from the axis 49 is 1.266. Thickness of the material forming the nipple 1 varies along the length of the nipple.

The thicknesses for the following sections of the nipple 1 are as follows: thickness of the wall 44 is 0.254; thickness of the second cap 25 is 0.079; distance of the point of the inner face 19 that is furthest from the outer face 17 is 0.871.

The length of the side wall 15, from the bottom 152 to the apex of second cap 25 (where axis 131 intersects inner surface 84) is 2.151 and the distance from the bottom 152 to the point where inner perimeter 45 intersects the outside surface of wall 44 is 3.700.

With reference to FIG. 2, the diameter of the aperture 4 is 0.635 and the diameter of the slit 12 is 0.381.

The depth of the vent 13, along axis 131, measured from the intersection of the axis 131 with the outer face 47 of the traverse wall 5 to the intersection of axis 131 with the outer surface 86, is 0.901.

Those of skill will readily understand how to adjust dimensions from those indicated in FIG. 1 to make a nipple suitable for domesticated mammals other than bovine calves or from materials other than natural rubber.

What is claimed is:

1. In a nipple for feeding liquids to a domesticated mammal, the nipple comprising an elastic molded body comprising:

(A) a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, (B) a traverse wall having an inner perimeter and an outer perimeter, the inner perimeter being joined contiguously over its entire length to the proximate end of the nipple tube and the outer perimeter being separated from the inner perimeter and more distant from the proximate end of the nipple tube than the inner perimeter, and having an external face and an internal face, the external face being on the side of the nipple not exposed to liquid feed and the internal face being on the side of the nipple exposed to liquid feed when the nipple is used, (C) a vent located between the inner perimeter and the outer perimeter of the traverse wall and extending from the external face to the internal face of the traverse wall, wherein the vent in the traverse wall is an opening defined by a wall which extends from the external to the internal face of the traverse wall and is substantially cylindrically disposed about an axis, and (D) a means for attaching the nipple to a receptacle which contains liquid feed for the mammal, the improvement which comprises a check valve at the end of the vent at the internal face of the traverse wall, the check valve comprising a means for equalizing pressure inside and outside of the nipple during withdrawal of liquid from the nipple by suckling of the mammal while preventing leakage of liquid out of the nipple, the means comprising an annulus which is centered on the axis of the vent, has an inner radius that is approximately the same as the distance from the wall to the axis of the vent, has a top face that is positioned inwardly into the space inside the nipple from the inward face of the transverse section, and is integrally joined to a second cap which blocks the opening of the annulus, protrudes inwardly from the top face of the annulus into the space inside the nipple, has an inside wall which faces the opening of the annulus and an outside wall which faces inwardly into the inside of the nipple, and has a slit that extends from the inside wall to the outside wall of the second cap.

2. The improvement according to claim 1 wherein the length between the distal end and the proximate end of the nipple tube and the thickness of the wall of the nipple tube render the nipple suitable for suckling by bovine calves.

3. The improvement according to claim 2 wherein the nipple is made of natural rubber.

4. In a nipple for feeding liquids to a domesticated mammal, the nipple comprising an elastic molded body comprising:

(A) a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, wherein the nipple tube at the distal end thereof has a first cap, which comprises the self-sealing aperture, and wherein the wall of the nipple tube consists of the first cap and a tube which extends from the first cap to the proximate end of the nipple tube and, when the nipple tube is not flexed, is substantially cylindrically disposed about a first axis, and wherein the self-sealing aperture of the first cap is a slit extending through the wall of the nipple tube, (B) a traverse wall having an inner perimeter and an outer perimeter, the inner perimeter being joined contiguously over its entire length to the proximate end of the nipple tube, the outer perimeter being separated from the inner perimeter and more distant from the proximate end of the nipple tube than the inner perimeter, and the inner and outer perimeters beings substantially circular about the first axis, and having an external face and an internal face, the external face being on the side of the nipple not exposed to liquid feed and the internal face being on the side of the nipple exposed to liquid feed when the nipple is used, (C) a vent located between the inner perimeter and the outer perimeter of the traverse wall and extending from the external face to the internal face of the traverse wall, wherein the vent in the traverse wall is an opening defined by a wall which extends from the external to the internal face of the traverse wall and is substantially cylindrically disposed about a second axis, and (D) a means for attaching the nipple to a receptacle which contains liquid feed for the mammal, the improvement which comprises a check valve at the end of the vent at the internal face of the traverse wall, the check valve comprising a means for equalizing pressure inside and outside of the nipple during withdrawal of liquid from the nipple by suckling of the mammal while preventing leakage of liquid out of the nipple, the means comprising an annulus which is centered on the second axis, has an inner radius that is approximately the same as the distance from the wall to the second axis, has a top face that is positioned inwardly into the space inside the nipple from the inward face of the transverse section, and is integrally joined to a second cap which blocks the opening of the annulus, protrudes inwardly from the top face of the annulus into the space inside the nipple, has an inside wall which faces the opening of the annulus and an outside wall which faces inwardly into the inside of the nipple, and has a slit that extends from the inside wall to the outside wall of the second cap.

5. The improvement according to claim 4 wherein the length between the distal end and the proximate end of the nipple tube and the thickness of the wall of the nipple tube render the nipple suitable for suckling by bovine calves.

6. The improvement according to claim 5 wherein the nipple is made of natural rubber.

7. In a nipple for feeding liquids to a domesticated mammal, the nipple comprising an elastic molded body comprising:

(A) a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, wherein the nipple tube at the distal end thereof has a first cap, which comprises the self-sealing aperture, and wherein the wall of the nipple tube consists of the first cap and a tube which extends from the first cap to the proximate end of the nipple tube and, when the nipple tube is not flexed, is substantially cylindrically disposed about a first axis, and wherein the self-sealing aperture of the first cap is a slit extending through the wall of the nipple tube, (B) a traverse wall having an inner perimeter and an outer perimeter, the inner perimeter being joined contiguously over its entire length to the proximate end of the nipple tube, the outer perimeter being separated from the inner perimeter and more distant from the proximate end of the nipple tube than the inner perimeter, and the inner and outer perimeters being substantially circular about the first axis, and having an external face and an internal face, the external face being on the side of the nipple not exposed to liquid feed and the internal face being on the side of the nipple exposed to liquid feed when the nipple is used, (C) a vent located between the inner perimeter and the outer perimeter of the traverse wall and extending from the external face to the internal face of the traverse wall, wherein the vent in the traverse wall is an opening defined by a wall which extends from the external to the internal face of the traverse wall and is substantially cylindrically disposed about a second axis, and (D) a means for attaching the nipple to a receptacle which contains liquid feed for the mammal, wherein the means for attaching the nipple to the receptacle comprises a side wall having a top, a bottom, an outer face extending from the top to the bottom, and an inner face extending from the top to the bottom, the top of the outer face of the side wall being contiguously joined to the outer circumference of the external face of the traverse wall, and the top of the inner face of the side wall being contiguously joined to the outer circumference of the internal face of the traverse wall, wherein the inner face of the side wall has a pitch inward toward the first axis, the improvement which comprises a check valve at the end of the vent at the internal face of the traverse wall, the check valve comprising a means for equalizing pressure inside and outside of the nipple during withdrawal of liquid from the nipple by suckling of the mammal while preventing leakage of liquid out of the nipple, the means comprising an annulus which is centered on the second axis, has an inner radius that is approximately the same as the distance from the wall to the second axis, has a top face that is positioned inwardly into the space inside the nipple from the inward face of the transverse section, and is integrally joined to a second cap which blocks the opening of the annulus, protrudes inwardly from the top face of the annulus into the space inside the nipple, has an inside wall which faces the opening of the annulus and an outside wall which faces inwardly into the inside of the nipple, and has a slit that extends from the inside wall to the outside wall of the second cap.

8. The improvement according to claim 7 wherein the length between the distal end and the proximate end of the nipple tube and the thickness of the wall of the nipple tube render the nipple suitable for suckling by bovine calves.

9. The improvement according to claim 8 wherein the nipple is made of natural rubber.

\* \* \* \* \*